(12) United States Patent
Pawlowski

(10) Patent No.: US 11,738,690 B2
(45) Date of Patent: Aug. 29, 2023

(54) VEHICLE CARGO MANAGEMENT SYSTEM

(71) Applicant: Michael Joseph Pawlowski, St. Johns, MI (US)

(72) Inventor: Michael Joseph Pawlowski, St. Johns, MI (US)

( * ) Notice: Subject to any disclaimer, the term of this patent is extended or adjusted under 35 U.S.C. 154(b) by 230 days.

(21) Appl. No.: 17/186,870

(22) Filed: Jun. 17, 2021

(65) Prior Publication Data
US 2022/0402436 A1    Dec. 22, 2022

(51) Int. Cl.
| | |
|---|---|
| *B60R 7/04* | (2006.01) |
| *B60Q 3/225* | (2017.01) |
| *B60R 16/03* | (2006.01) |
| *B60R 11/06* | (2006.01) |

(52) U.S. Cl.
CPC ............. *B60R 7/043* (2013.01); *B60Q 3/225* (2017.02); *B60R 16/03* (2013.01); *B60R 7/04* (2013.01); *B60R 11/06* (2013.01)

(58) Field of Classification Search
CPC ............ B60R 7/04; B60R 7/043; B60R 11/06
USPC .................................. 296/37.8, 37.16, 37.15
See application file for complete search history.

(56) References Cited

U.S. PATENT DOCUMENTS

| | | | |
|---|---|---|---|
| 4,122,944 A | 10/1978 | De Napoli | |
| 4,802,705 A | 2/1989 | Elwell | |
| 4,863,208 A * | 9/1989 | Streett | E05B 17/0033 |
| | | | 292/DIG. 72 |
| 4,957,228 A | 9/1990 | Balka | |
| D320,372 S * | 10/1991 | Alberts | D3/905 |
| 5,598,961 A | 2/1997 | Sills | |
| 5,669,537 A | 9/1997 | Saleem et al. | |
| 5,979,725 A * | 11/1999 | Lehrman | B60R 7/02 |
| | | | 220/23.88 |
| 6,050,202 A | 4/2000 | Thompson | |
| 6,106,044 A * | 8/2000 | Schlachter | B60R 7/043 |
| | | | 297/188.09 |
| 6,113,172 A | 9/2000 | Chaloult et al. | |
| 6,241,137 B1 * | 6/2001 | Corr | B60R 9/00 |
| | | | 224/539 |
| 6,253,943 B1 | 7/2001 | Spykerman et al. | |
| 6,290,277 B1 | 9/2001 | Spykerman et al. | |

(Continued)

FOREIGN PATENT DOCUMENTS

| | | | | |
|---|---|---|---|---|
| DE | 102019208242 B4 * | 2/2023 | | B60N 3/06 |
| KR | 20190059177 A * | 5/2019 | | |

*Primary Examiner* — Justin M Larson
(74) *Attorney, Agent, or Firm* — J. Gordon Lewis

(57) ABSTRACT

A vehicle cargo management system is installed in the rear seating area of a utility vehicle after removal of the seats. The utility vehicle includes a floor pan defining a planer rear storage surface and left and right foot wells separated by a longitudinally extending drive shaft hump. The foot wells define inwardly tapered inner rear wheel wells. The wells each have a characteristic depth below the rear storage surface, a lateral width and a longitudinal length. The cargo management system includes left, right and center container portions, each having a base member including integrally formed floor and circumferentially arranged wall members nested within a foot well. The container portions each have a base member including integrally formed floor and wall members configured to be nested within a respective foot well. The closure members are each affixed to an inner wall member of said container portion by an elongated hinge.

19 Claims, 13 Drawing Sheets

(56) References Cited

U.S. PATENT DOCUMENTS

| | | | | |
|---|---|---|---|---|
| 6,386,612 | B2 * | 5/2002 | Hofmann | B60R 7/043 |
| | | | | 296/37.6 |
| 6,478,355 | B1 | 11/2002 | Van Eden et al. | |
| 6,488,327 | B1 * | 12/2002 | Pearse | B60N 2/2863 |
| | | | | 297/188.1 |
| 6,607,228 | B2 | 8/2003 | Carter, III et al. | |
| 6,644,523 | B1 * | 11/2003 | Salas | B60R 7/043 |
| | | | | 224/281 |
| 6,874,667 | B2 * | 4/2005 | Dykstra | B60R 5/045 |
| | | | | 224/543 |
| 7,048,320 | B2 * | 5/2006 | Rubel | B60R 7/02 |
| | | | | 296/37.6 |
| 7,093,871 | B2 | 8/2006 | Lim et al. | |
| 8,075,040 | B2 | 12/2011 | Arnold | |
| 8,393,665 | B2 | 3/2013 | Villano et al. | |
| 8,544,708 | B2 | 10/2013 | Maimin | |
| 9,016,749 | B2 * | 4/2015 | Mueller | B60N 2/3047 |
| | | | | 296/37.14 |
| 9,096,179 | B2 | 8/2015 | Reiseder | |
| D772,141 | S | 11/2016 | Christofferson | |
| 9,481,310 | B2 * | 11/2016 | Chawlk | B60R 7/043 |
| 9,580,021 | B1 | 2/2017 | Pizarro | |
| 9,731,659 | B2 | 8/2017 | Goldberg | |
| 9,797,167 | B2 | 10/2017 | Schuling et al. | |
| 10,124,738 | B2 | 11/2018 | Cronin et al. | |
| 10,150,420 | B2 | 12/2018 | Stojkovic | |
| 10,358,059 | B2 | 7/2019 | Keziah et al. | |
| 10,479,285 | B2 | 11/2019 | Schuling | |
| D875,398 | S * | 2/2020 | Kovach | D3/304 |
| 10,857,947 | B2 * | 12/2020 | Kovach | E05B 67/003 |
| 10,926,708 | B2 * | 2/2021 | Gill | B60N 2/02 |
| 10,926,717 | B2 * | 2/2021 | Berg | B60R 7/043 |
| D932,405 | S * | 10/2021 | Setina | D12/195 |
| 11,498,488 | B2 * | 11/2022 | Setina | B60R 21/026 |
| 11,597,325 | B2 * | 3/2023 | Huggett | B60R 5/04 |
| 2008/0231066 | A1 | 9/2008 | Harrell | |
| 2009/0108591 | A1 | 4/2009 | De Vries | |
| 2009/0108592 | A1 | 4/2009 | De Vries | |
| 2009/0108595 | A1 | 4/2009 | De Vries | |
| 2009/0200350 | A1 | 8/2009 | Brallier et al. | |
| 2012/0112487 | A1 | 5/2012 | Wilson | |
| 2013/0038080 | A1 * | 2/2013 | Tate, Jr. | B60R 7/043 |
| | | | | 296/37.5 |
| 2015/0121974 | A1 | 5/2015 | Schuling et al. | |
| 2016/0200258 | A1 * | 7/2016 | Chawlk | B60R 7/043 |
| | | | | 296/37.14 |
| 2017/0121054 | A1 | 5/2017 | Schuling et al. | |
| 2018/0118128 | A1 | 5/2018 | Schuling | |
| 2019/0126832 | A1 | 5/2019 | Knichel | |
| 2019/0126994 | A1 | 5/2019 | Brown | |
| 2019/0256008 | A1 | 8/2019 | Rustwick | |
| 2019/0256156 | A1 | 8/2019 | Schuling | |
| 2022/0340085 | A1 * | 10/2022 | Li | B60R 7/043 |
| 2022/0402436 | A1 * | 12/2022 | Pawlowski | B60R 7/04 |

\* cited by examiner

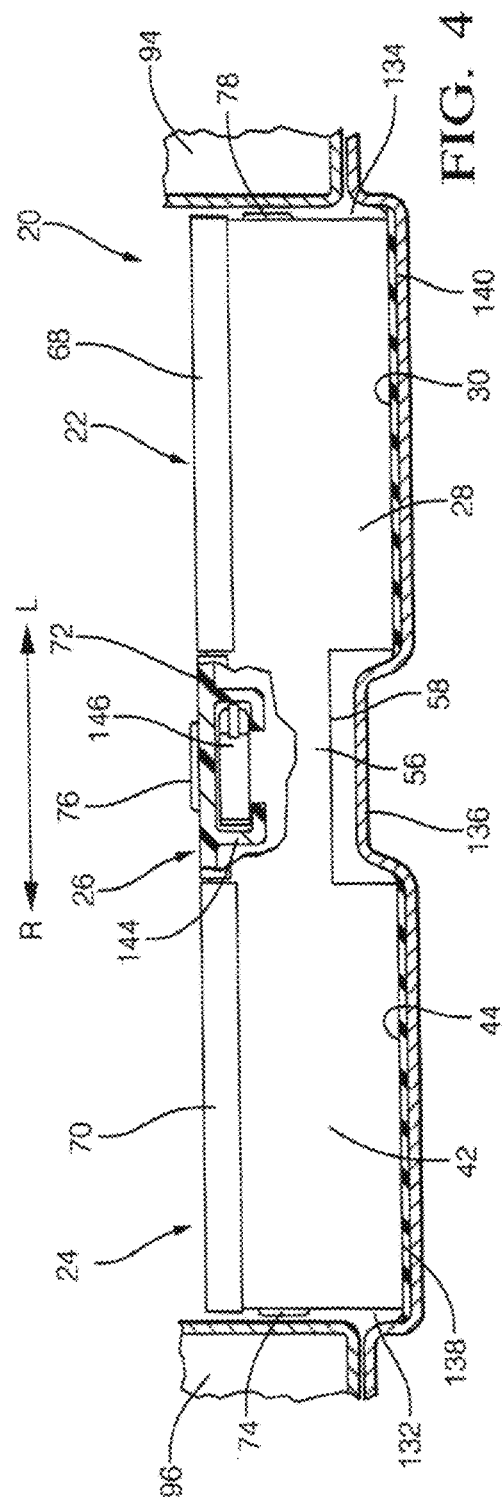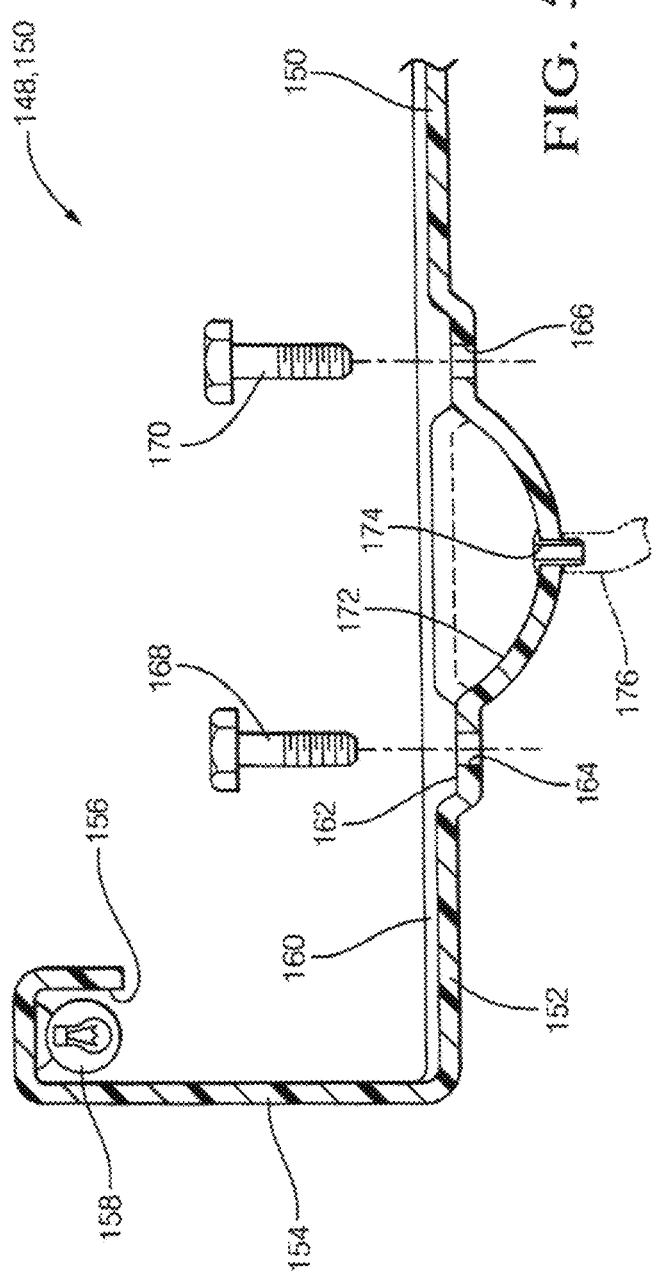

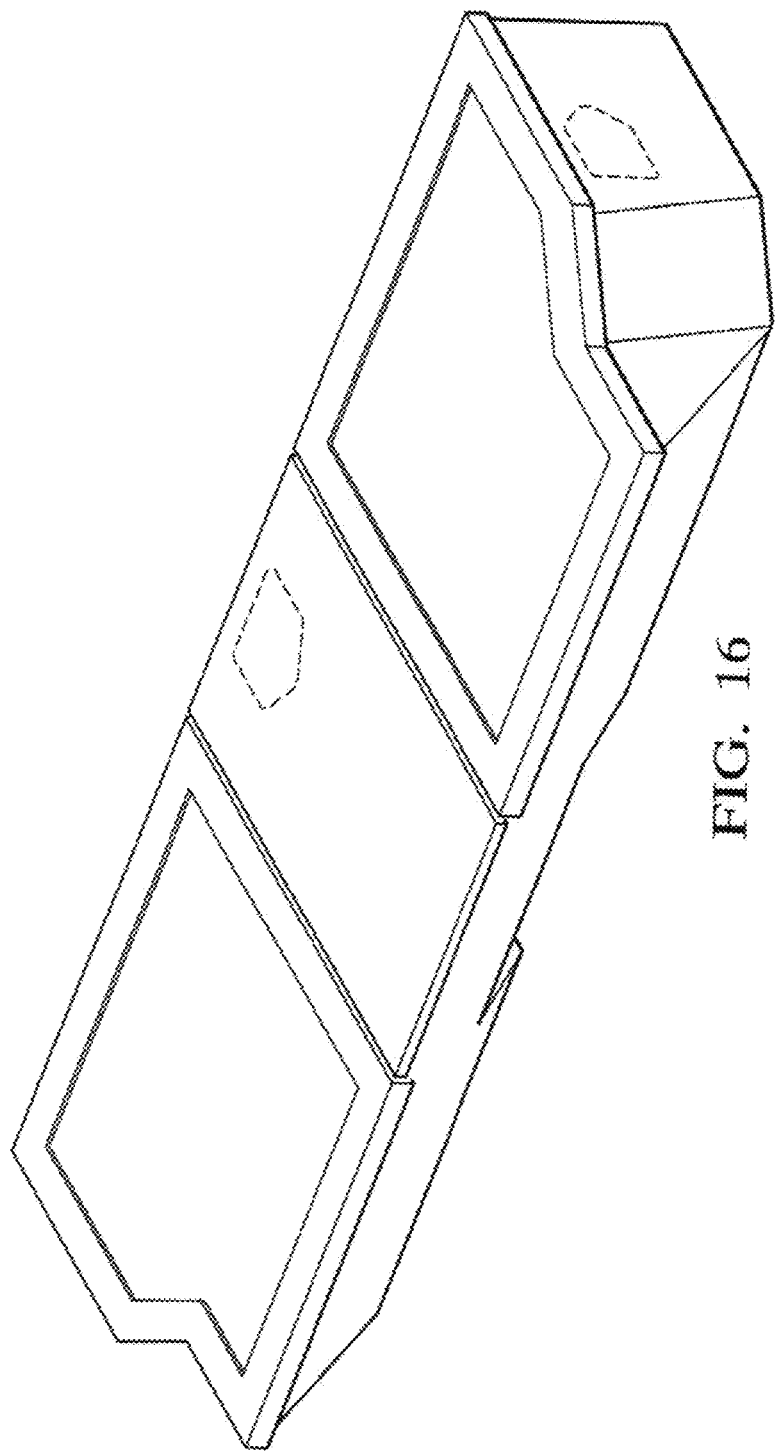
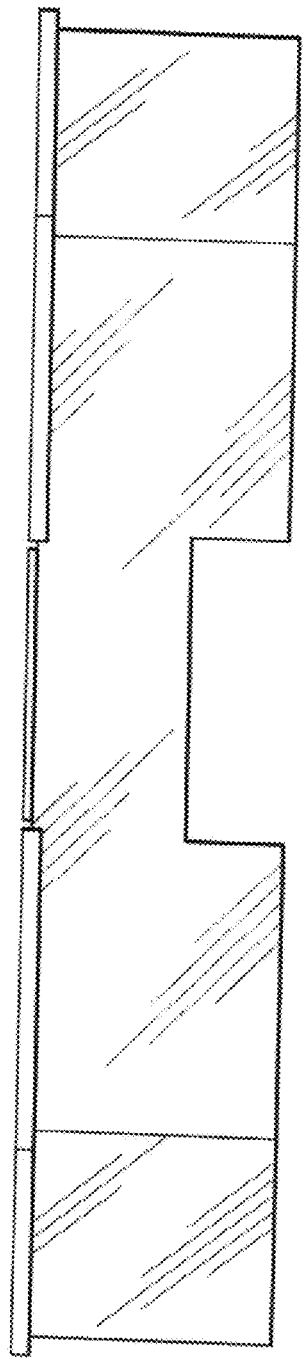
FIG. 16
FIG. 17

VEHICLE CARGO MANAGEMENT SYSTEM

TECHNICAL FIELD

The present invention generally relates to storage apparatus for managing cargo in the interior of a vehicle to enhance load carrying capacity, and particularly to such storage apparatus having a low profile enabling flexibility in reconfiguring multi-use vehicles for varied applications. More particularly still, the present invention relates to high security storage secreted within the host vehicle.

BACKGROUND OF THE INVENTION

Vehicle structures for carrying cargo, and particularly aftermarket cargo structures, are typically mounted on the exterior of a vehicle. Such structure may be mounted on the top, sides, back or over the hood of the vehicle. Any cargo affixed to the structure may be susceptible to environmental damage, theft, and the like. Mounting such structures to the exterior of the vehicle may also tend to reduce fuel efficiency, and adversely change the aerodynamic profile of the vehicle. There exists a need for a method and apparatus for a cargo management system suitable for mounting to the interior of a vehicle.

A large variety of vehicle storage systems have been described in the prior art. In recent years, the proliferation of vans and sports utility vehicles (SUV's) have created a new set of challenges for vehicle designers, because the area behind the rear-most seat ($2^{nd}$ or $3^{rd}$ row) is the largest area for the storage of cargo, and it is typically open to view from the exterior of the vehicle. Privacy shields are known and include devices which are rolled up when the cargo space is empty or extended to cover the cargo space if luggage, camping gear, weapons, business accessories or the like are located in the storage area.

Compartments are also commonplace in vehicles and include the glove box, roof or between-the-seat consoles and compartments in the doors, seat backs or the sides of the cargo area. Such compartments can be covered by a removable or hinged door, by cargo netting or other closures. Compartments are also known which extend below the floor of a cargo area. One example is the spare-wheel storage area used in many vehicles, the spare wheel being oriented in a generally horizontal orientation and parallel to a hinged cover which forms part of the floor of the cargo area. In other SUVs, the spare wheel is located within the storage or cargo area behind the rear seat. Various storage bins can be located in the side wall trim of the cargo area, and some of such vehicles also include a door to store tool kits, a jack and the like.

Space utilization is an important consideration for many people shopping for a new vehicle. An optimum cargo management system would offer a large amount of storage volume, organizational features, versatility, privacy, occupant safety, robustness, convenience and the like. Such a system would benefit the highly diverse buying public which includes travelers, sportsmen and women campers, "soccer moms and dads", gardeners, etc. Accordingly, the development of such a system would represent a significant advance in this art.

Lastly, there is an ever increasing requirement for consumers that the interiors of their vehicles provide for a variety of tasks. Cargo management, storage and providing of tray tables r support systems are a few of the major areas of development in recent years. While many systems have been provided which adequately solve many consumer needs, new and innovative solutions are required to meet the changing demands of package restraints in new vehicle design.

A search of issued patents and published applications in the field of the application of vehicle cargo management systems reveals patents related generally to the field of the present invention but do not anticipate nor disclose the apparatus or method of the present invention. The discovered patents related generally to the present invention are discussed herein below.

U.S. Pat. No. 6,290,277 B1 to Spykerman et al entitled "Cargo Management and Article Support Systems" discloses a cargo system for a vehicle having a floor and a seat that folds and forms a cargo surface. The cargo systems include a cargo platform having a front edge. The cargo platform is connectable to the vehicle for movement between a lowered position with the front edge being located under a portion of the seat and a raised position with the cargo platform being generally aligned with the cargo surface of the seat thereby forming an upper tier and a lower tier.

U.S. Pat. No. 6,874,667 B2 to Dykstra et al. entitled "Vehicle Cargo Management System" discloses a cargo management system including a deep well storage area beneath a cargo floor, which well may be horizontally and/or vertically divided and which preferably includes a plurality of doors to access the well. In the illustrated embodiment, the management system also includes a panel which may be placed into three positions: a first storage position in which the panel is flush against the back of the rear seat; a second shelf position in which the panel is horizontal and spaced from the cargo door by a first distance; and a third privacy shield position in which the panel is also horizontal but is spaced from the cargo floor a second distance, the second distance exceeding the first distance.

U.S. Pat. No. 9,580,021 B1 to Pizarro entitled "Cargo Management System" discloses a cargo management system for the interior of a vehicle having a removable hardtop that may comprise two rails, a rack and a tray. The rails may comprise tie-down anchors. The tray may be secured to the rack using hook-and-loop fasteners.

None of the above listed U.S. patents disclose or suggest the presently claimed method and apparatus for the Vehicle Cargo Management System of the present invention. Each of the above listed U.S. patents (i.e., U.S. Pat. Nos. 6,290,277 B1; 6,874,667 B2; and 9,580,021 B1) is hereby incorporated herein by reference.

SUMMARY OF THE INVENTION

The forgoing problems and limitations are overcome and other advantages are provided by a new and improved reconfigurable vehicle cargo management system adapted for installation/removal within the mid-vehicle seating area having multiple disguised container portions accessible through separate lockable horizontal closure members disposed substantially flush with a rear cargo storage surface.

It is an object of the present invention to provide a vehicle cargo management system which includes left and right container portions, each having a base member including integrally formed floor and circumferentially arranged wall members configured to be nestingly disposed within respective left and right foot wells, and a center container portion having a base member including integrally formed floor and circumferentially arranged wall members configured to be nestingly disposed above a drive shaft hump It is a further object of the present invention to provide flush lock/latch mechanisms operable to selectively secure the left and right closure members in the closed position which are accessible only upon opening the left and right rear doors, respectively.

It is yet a further object of the present invention to provide flush lock/latch mechanisms operable to selectively secure the center closure member in the closed position which is accessible during operation of the vehicle by the driver and/or front seat passenger.

It is yet a further object of the present invention to provide left, right and center closure members and a rear storage surfaces which are formed/covered by bed-liner type material having substantially similar color, texture and appearance.

It is still a further object of the present invention to provide left, right and center container portions which are separately formed and are releasably interconnected by discrete fasteners, whereby the right container portion can be removed and replaced by the right rear seat and, independently, the left container portion can be removed and replaced by the left rear seat.

It is yet still another object of the invention wherein each of the container portions include gravity fed automatic drainage system including a flow passage extending through the seat/container portion floor pan attachment point.

These and other features and advantages of this invention will become apparent upon reading the following specification, which, along with the drawings, describes preferred and alternative embodiments of the invention in detail.

BRIEF DESCRIPTION OF THE DRAWINGS

The invention is described by way of example below using advantageous embodiments with reference to the attached drawings, in which:

FIG. 4, shows a rear facing cross-sectional view of the rear passenger area of the Jeep™ type vehicle with the left and right rear seats removed and the preferred placement of the preferred embodiment of the present invention of FIGS. 1 and 2 installed in juxtaposition with the floor pan of the host vehicle;

FIG. 5, shows a broken sectional detail of one of the container portions illustrating selected features including internal illumination, fluid drainage and attachment to the floor pan of the host vehicle employing pre-existing attachment points for the original equipment (OE) rear seat assemblies;

FIG. 16, shows a right-rear-elevated perspective view of the first embodiment of a new design for a vehicle management system, as shown in FIG. 15 in isolation with left, right and center closure members in a fully closed position;

FIG. 17, shows a rear plan view of the vehicle management system of FIG. 16 in isolation;

Although the drawings represent embodiments of the present invention, the utility drawings are not necessarily to scale and certain features may be exaggerated in order to illustrate and explain the present invention. The exemplification set forth herein illustrates an embodiment of the invention, in one form, and such exemplifications are not to be construed as limiting the scope of the invention in any manner.

DESCRIPTION OF THE ALTERNATIVE EMBODIMENTS

Figure 1:
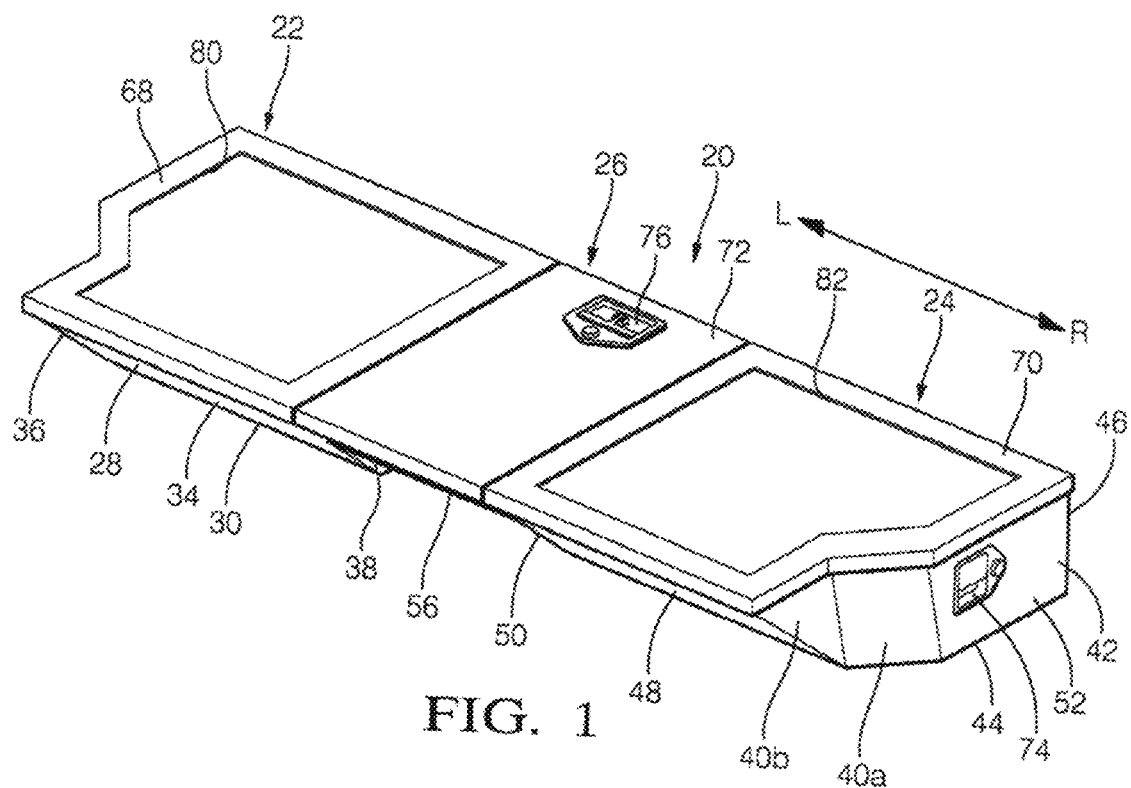
FIG. 1, shows a right-rear-elevated perspective view of a preferred embodiment of the present invention adapted for installation in a Jeep™ type vehicle (Note: positional reference "left" equates to the driver side of a host vehicle and positional reference "right" equates to the passenger side of a host vehicle)
Figure 2:
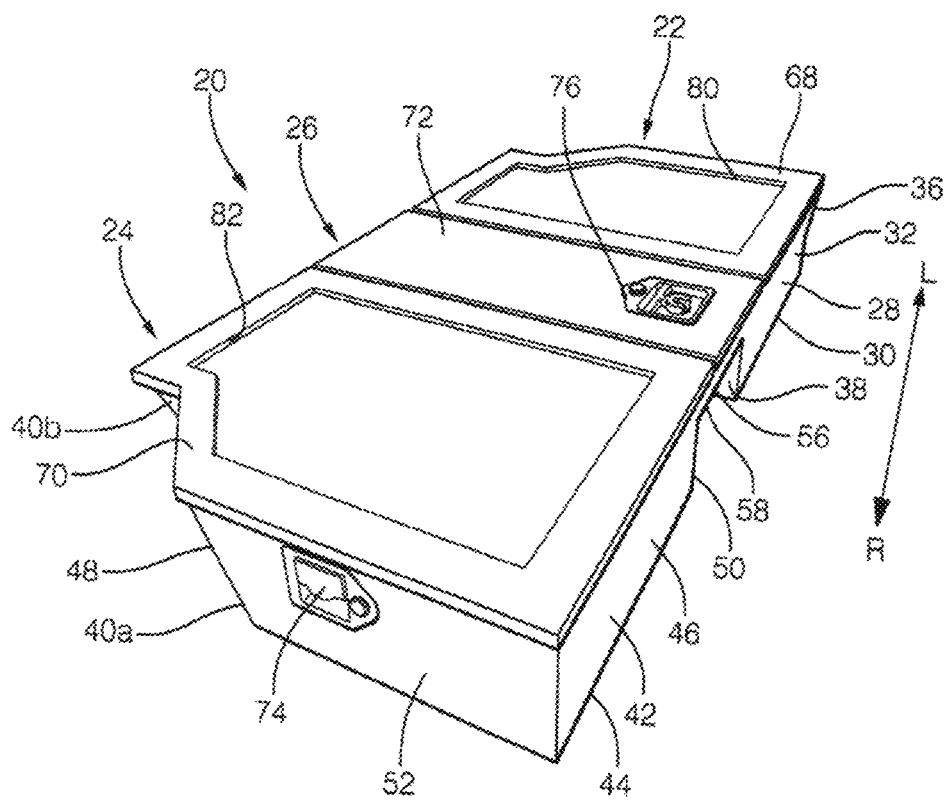
FIG. 2, shows a right-front-elevated perspective view of the preferred embodiment of the present invention of FIG. 1.
Figure 3:
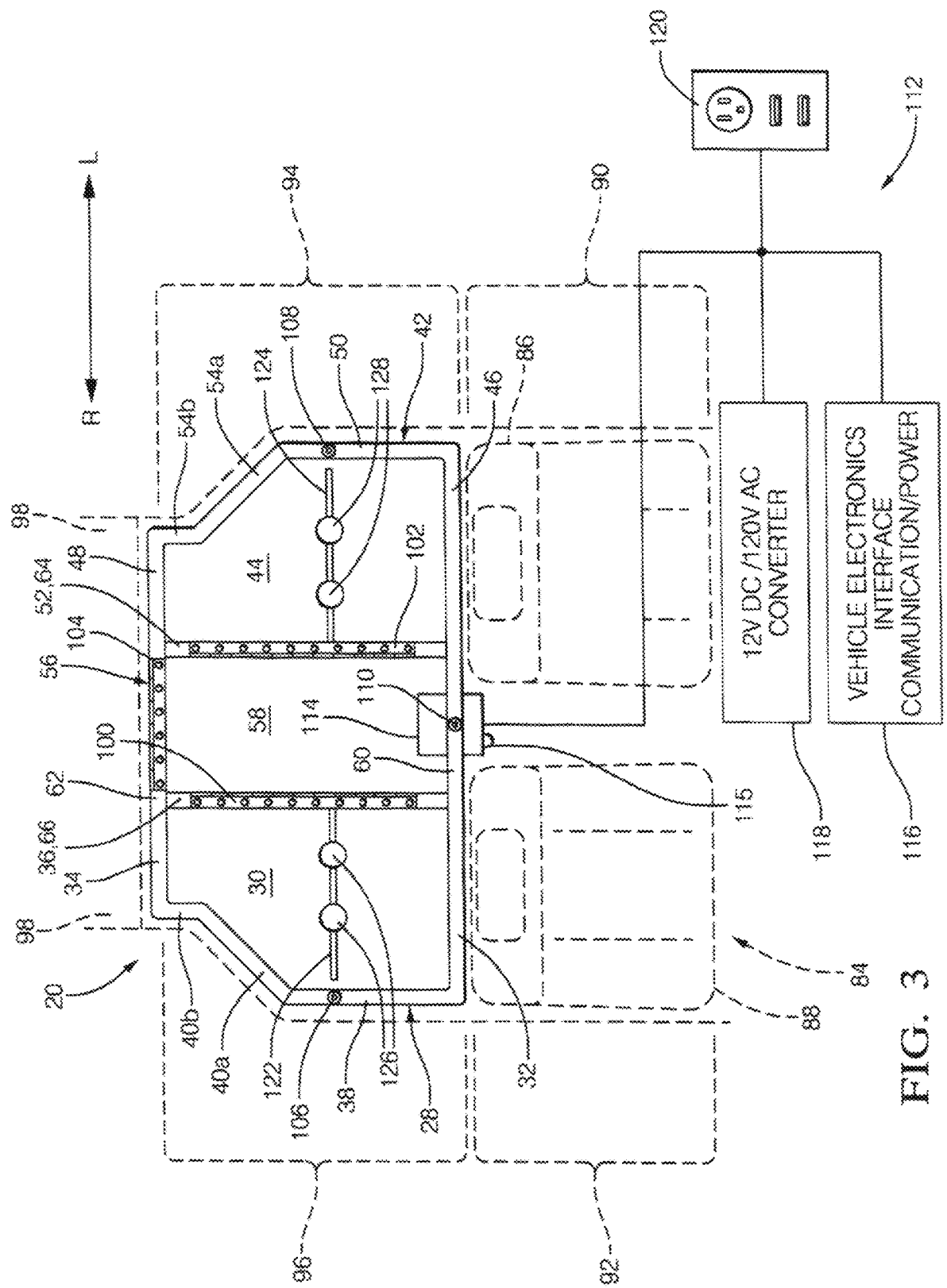
FIG. 3, shows a top plan view of the preferred embodiment of the present invention of FIGS. 1 and 2 with the left, right and center closure members removed to illustrate the internal details of the left, right and center container portions.

Referring to the drawing figures, particularly to FIGS. 1, 2 and 3, a vehicle cargo management system 20 adapted for installation in the rear seating area of a Jeep™ type vehicle after the left and right rear seats have been removed is illustrated for conversion of the rear seating area to a supplemental rear vehicle storage area.

The rear cargo management system 20 includes a left container portion 22, a right container portion 24 and a center container portion 26, which are preferably integrally interconnected. The left container portion 22 includes a base member 28 consisting of a generally rectangular horizontal floor member 30 and generally vertically upstanding front, rear, left side and right side wall members, 32, 34, 36 and 38, respectively. The right container portion 24 includes a base member 42 consisting of a generally rectangular horizontal floor member 44 and generally vertically upstanding front, rear, left side and right side wall members, 46, 48, 50 and 52, respectively. The center container portion 26 includes a base member 56 consisting of a generally rectangular horizontal floor member 58 and generally vertically upstanding front, rear, left side and right side wall members, 60, 62, 64 and 66, respectively. Note that for embodiments of the invention where the base members 28, 42 and 56 of the container portions 22, 24 and 26 are integrally formed, right side wall member 38 of the left container portion 24 is common with right side wall member 66 of the base member 56 of the center container portion 26. Furthermore, left side wall member 54 of the left container portion 22 is common with left side wall member 64 of the base member 56 of the center container portion 26.

The open top of the left container portion 22 is closed by a left closure member 68. The open top of the right container portion 24 is closed by a right closure member 70. The open top of the center container portion 26 is closed by a center closure member 72. The container portions 22, 24 and 26, as well as the closure members 68, 70 and 72 are preferably formed of heavy gauge material such as aluminum, steel, fiberglass or injection molded plastic. The overall management system must be rigid enough to support heavy objects contained therein during vehicle operation and to avoid warpage when subjected to high temperature environments. Furthermore, the closure members 68, 70 and 72 must be rigid enough to support loads atop the overall rear vehicle storage area. Closure members 68 and 70 are illustrated with large offsets/depressions 80 and 82, respectfully, providing supplemental rigidity for loading from above.

Referring to FIG. 3, the vehicle cargo management system 20 is installed within the rear seating area of a host vehicle 84, illustrated in phantom, with the vehicle 84 including driver and front passenger seats 86 and 88, respectively. The host vehicle 84 has a driver side door and front passenger side door 90 and 92, respectively. Rear driver side and passenger side seats have been removed and replaced by the cargo management system 20. Rear driver side and passenger side doors 94 and 96, respectively, straddle and provide external access to the cargo management system 20. A flat, horizontal rear cargo area 98 extends beyond the cargo management system 20 which is substantially coplanar with the collective uppermost surface of the left, right and center closure members 68, 70 and 72. Furthermore, the closure members 68, 70 and 72 are provided with overfacements or coverings substantially identical in overall appearance with the bed-liner typically provided by the host vehicle manufacturer.

The cargo management system 20 is illustrated in FIG. 3 with the closure members 68, 70 and 72 removed to expose certain internal details. A first elongated piano-type hinge 100 has its lower flange affixed to the upward facing surface of the left side wall member 36 of the right container member 24. In assembly, the upper flange (not illustrated) is affixed to the adjacent overlaying right closure member 70 to enable limited hinged displacement through a fixed range on movement. A second elongated piano-type hinge 102 has its lower flange affixed to the upward facing surface of the right side wall member 52 of the left container member 22. In assembly, the upper flange (not illustrated) is affixed to the adjacent overlaying right closure member 68 to enable limited hinged displacement through a fixed range of movement. A third elongated piano-type hinge 104 has its lower flange affixed to the upward facing surface of the rear side wall member 62 of the center container member 26. In assembly, the upper flange (not illustrated) is affixed to the adjacent overlaying center closure member 72.

An upwardly extending contact switch 106 is embedded in the upward facing surface of the right side wall member 38 of the right container member 24. Similarly, upwardly extending contact switches 108 and 110 are embedded in the upward facing surfaces of the left side wall member 50 of the left container member 22 and the upward facing surface of the front side wall member 60 of the center container member 26. Contact switches 106, 108 and 110 are in circuit with an electric power/control system illustrated schematically as 112, passing through an electrical interface box 114. Contact switches 106, 108 and 110 sense the open/closed condition of closure members 70, 68 and 72, respectively.

The electric power/control system 112 includes a vehicle electronics interface for host vehicle based communication and power 116, a 12 VDC/120 VAC converter 118 and vehicle operator access ports 120 for 110 VAC, 12 VDC and USB ports. The electrical interface box 114 provides signal sensing, DC power and AC power within the vehicle cargo management system 20, as well as a vehicle operator visible system status display (e.g. LEDs) 115.

Formed in the floor members 30 and 44 of the right and left container portions 24 and 22, respectively are laterally extending troughs 122 and 124 as well as interconnecting pockets 126 and 128, respectively. The troughs 122 and 124 serve to collect and vent the flow of any liquids inadvertently entering or spilling within the container portions 24 and 22. The pockets 126 and 128 represent the lowermost portion of the floor members 30 and 44, and are aligned with attachment fittings provided with the host vehicle for selectively securing the original rear seats.

Referring to FIG. 4, placement of the vehicle cargo management system 20 within the rear seating area of the host vehicle is illustrated. The vehicle includes an integral floor pan 130 which is depressed below the rear cargo area 98, and forms left and right foot wells 132 and 134, respectively as well as a longitudinally extending integral drive shaft tunnel 136 extending above the foot wells 132 and 134. Pliable, resilient damping pads 138 and 140 are located under base members 42 and 28 respectively, providing thermal and shock insulation for the vehicle cargo management system 20, as well as accounting for spatial irregularities. The base member 56 of the center container portion 26 is spaced above the drive shaft tunnel 136 to isolate it from any drivetrain induced vibration. Furthermore, the floor members 30 and 44 are dimensioned to closely slip-fit within their respective foot wells 132 and 134 to prevent latitudinal or longitudinal vibration/displacement resulting from vehicle operation.

The lock-latch assemblies 74, 76 and 78 include separate key lock assemblies to limit accessibility to the contents of the left right and center portions 22, 24, 26, even when the host vehicle is secured and the side doors 96 and 98 are themselves, locked. Separately, when the side doors 96 and 98 are secured, access to the locking mechanisms of lock-latch assemblies 74 and 78 is prevented. Positioning of the hinge 104 and lock latch assembly 76 on the center closure member 72 uniquely enables driver/front passenger access to the center container portion 26 of the vehicle cargo management system 20, even during vehicle operation. As best illustrated in a broken-away portion of FIG. 4, a slide holder 144 can be integrally formed or discretely affixed to the lower surface of the center closure member 72, enabling rapid access to a weapon or critical tool 146 in an emergency.

Referring to FIG. 5, a broken sectional detail of a portion of a container portion 148 of a vehicle cargo management system 150 includes a floor member 152 integrally formed with an upright wall member 154. The uppermost portion of the wall member 154 is inwardly rolled to create a downwardly opening recess 156. Discrete individual incandescent or fluorescent lights or a string type light system 158 can be protectively mounted within the inverted recess 156 and electrically connected to the electrical interface box 114 for controlled actuation.

A trench 160 formed in the upper surface of the floor member 152 extends through a flanged recess 162 forming opposed bolt holes 164,166 aligned with rear original equipment (OE) seat mounting points (not illustrated) in the host vehicle for receiving attachment bolts 168 and 170. A water accumulator 172 is formed between the bolt holes 164/166 which includes a drain port 174 at the lowest part of the accumulator 172. A drain conduit 176 extends from the accumulator 172 and exits externally of the host vehicle.

Figure 6:
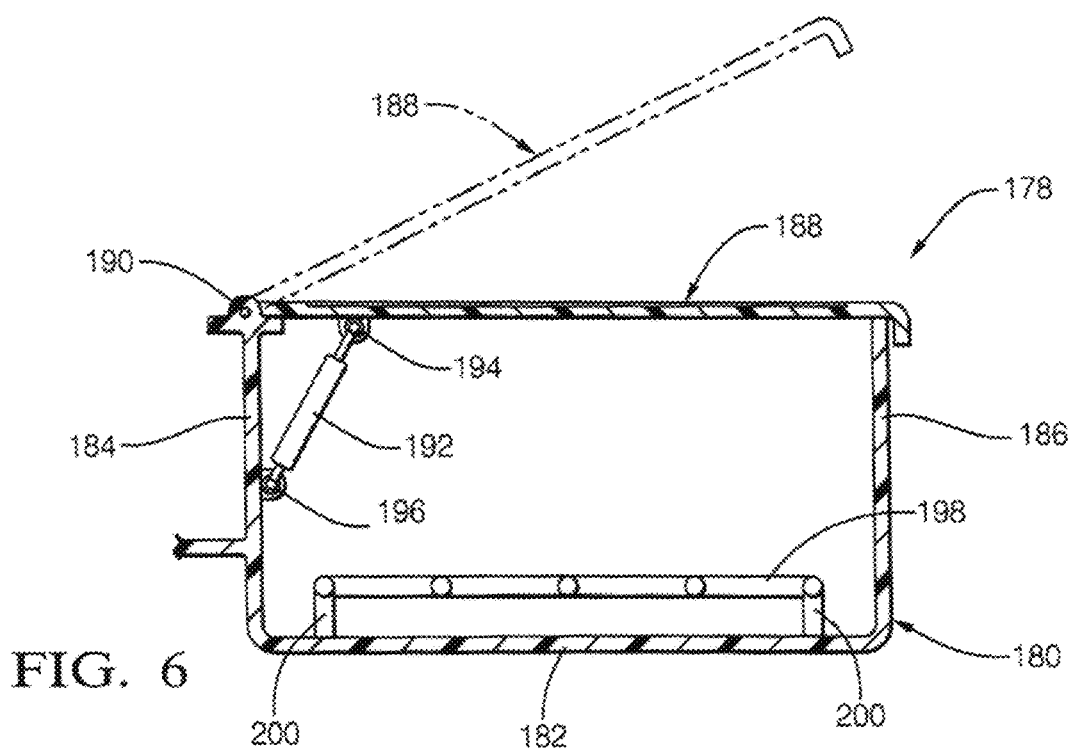
FIG. 6, shows a broken detail of one of the container portions including a damper strut interconnecting a wall member to an associated closure member for positioning the closure member in a partially or fully open position, and a floor spacing grate functioning to position the contents of the container portion above its associated floor member to enable circulation of air thereabout minimizing moisture/humidity buildup.

Referring to FIG. 6, a container portion 178 of a vehicle cargo management system includes a base member 180 forming a floor member 182 and enclosed by a plurality (4) of upstanding wall members 184 and 186. Wall member 184 is interconnected along one edge of a closure member 188 by a hinge 190 and is operable to translate between a closed position (solid line) and an open position (phantom). A gas or spring type damper strut 192 has an upper end pivotally interconnected with the closure member 188 through a first pivot joint 194 and a lower end pivotally interconnected with the wall member 184 through a lower pivot joint 196. This arrangement enabled positioning the closure member 188 in a partially or fully open position.

Figure 7:
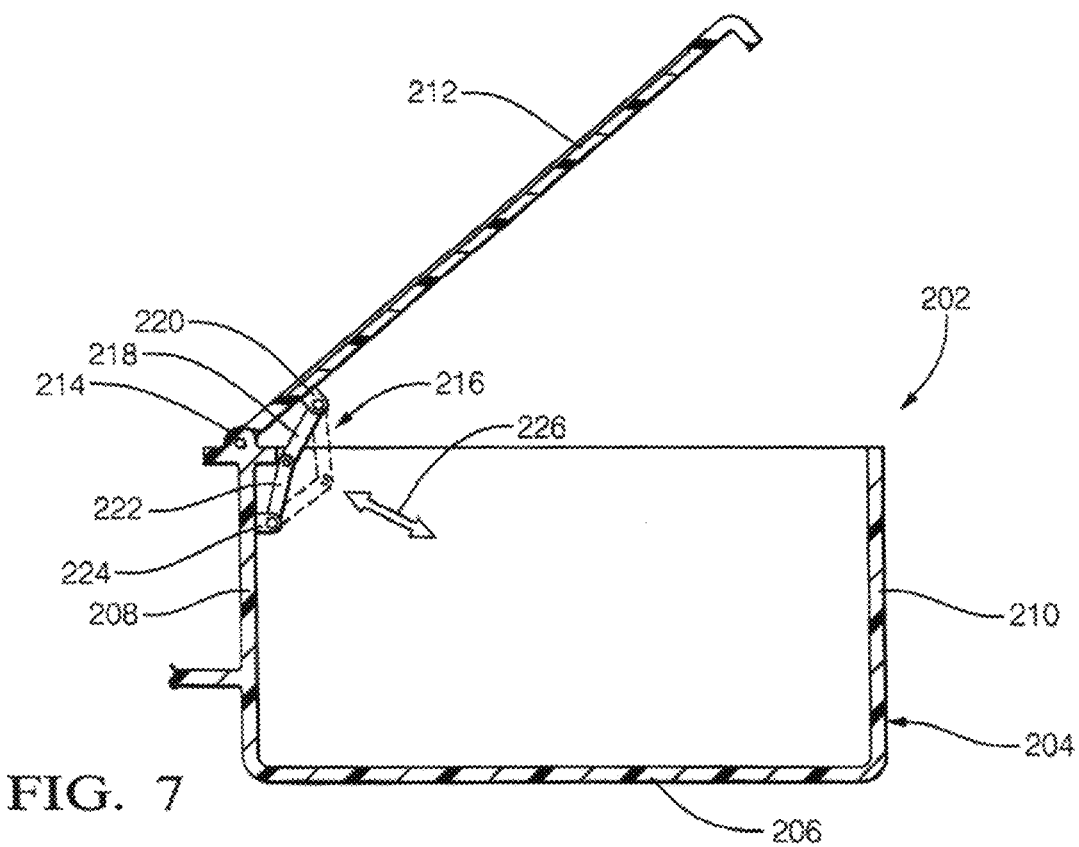
FIG. 7, shows a broken detail of one of the container portions including a rigid link over-center latch mechanism interconnecting a wall member to an associated closure member for locking in a fully open position.

A floor spacing grate 198 includes a plurality of legs 200 functioning to space the grate 198 and the contents of the container portion 178 placed above its associated floor member 182 to enable circulation of air thereabout minimizing moisture/humidity buildup within the container portion 178;

Referring to FIG. 7, a container portion 202 of a vehicle cargo management system includes a base member 204 forming a floor member 206 and enclosed by a plurality (4) of upstanding wall members 208 and 210. Wall member 208 is interconnected along one edge of a closure member 212 by a hinge 214 and is operable to translate between a closed position (such as illustrated in FIG. 6) and an open position. An over-center latch mechanism 216 has an upper link 218 having an upper end pivotally interconnected with the closure member 212 through a first pivot joint 220 and a lower end pivotally interconnected with an upper end of a lower link 222. The lower end of the lower link 222 is pivotally interconnected to the wall member 208 through a lower pivot joint 224. This arrangement enables positioning the closure member 212 in either a fully closed position or fully open position. Displacement of the joint interconnecting of the lower end of the upper link 218 and the upper end of the lower link 222 is illustrated by two-directional arrow 226.

Figure 8:
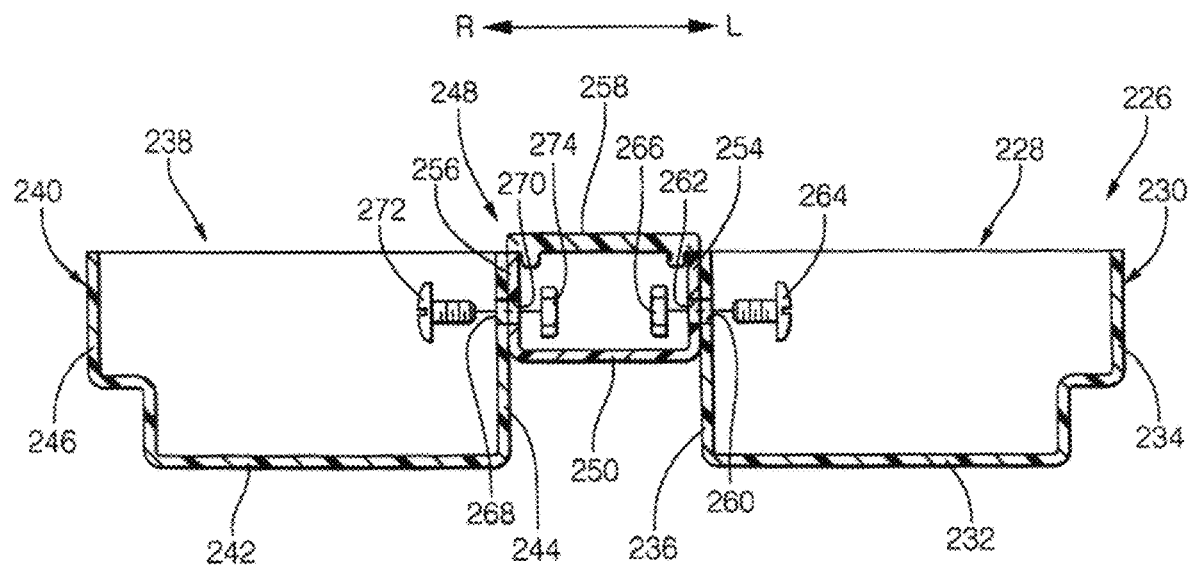
FIG. 8, shows an alternative embodiment of the invention wherein the vehicle cargo management system consists of three discrete container portions, with each container portion includes a base member attached by a hinge to an associated closure member, wherein adjacent container portions are selectively interconnected by fasteners such as bolts extending through registering through bores, wherein the left or right container portion can be removed and a single rear seat mounted in its place.

Referring to FIG. 8, an alternative embodiment of a vehicle cargo management system 226 includes a left container portion 228 forming a base member 230 defining a floor member 232, a left side wall member 234 and a right side wall member 236. A left closure member (not illustrated) is hingedly attached to the right side wall member 236. Vehicle cargo management system 226 further includes a right container portion 238 forming a base member 240 defining a floor member 242, a left side wall member 244 and a right side wall member 246. A right closure member (not illustrated) is hingedly attached to the left side wall member 244. Vehicle cargo management system 226 further includes a center container portion 248 forming a base member 250 defining a floor member 242, a left side wall member 254 and a right side wall member 256. A center closure member is hingedly attached to rear side wall member (not illustrated).

The right side wall member 236 of the left container portion 228 has a plurality of through holes 260 formed therein (only one is illustrated). The left side wall member 254 of the center container portion 248 has a plurality of through holes 260 formed therein (only one is illustrated). Through holes 260 and 262 register to enable passage of a removable fastener such as a screw 264 which threadably engages a nut 266 to removably affix the left and center container portions 228 and 248 in their illustrated positions. Likewise, the left side wall member 244 of the right container portion 238 has a plurality of through holes 268 formed therein (only one is illustrated). The right side wall member 256 of the center container portion 248 has a plurality of through holes 270 formed therein (only one is illustrated). Through holes 268 and 270 register to enable passage of a removable fastener such as a screw 264 which threadably engages a nut 274 to removably affix the right and center container portions 238 and 248 in their illustrated positions. This feature enables temporary removal of one or both of the left and right container portions 228 and 238, respectively and replacement with the corresponding original rear seat or, alternatively, a temporary storage task in the modified larger special envelope.

Figure 9:
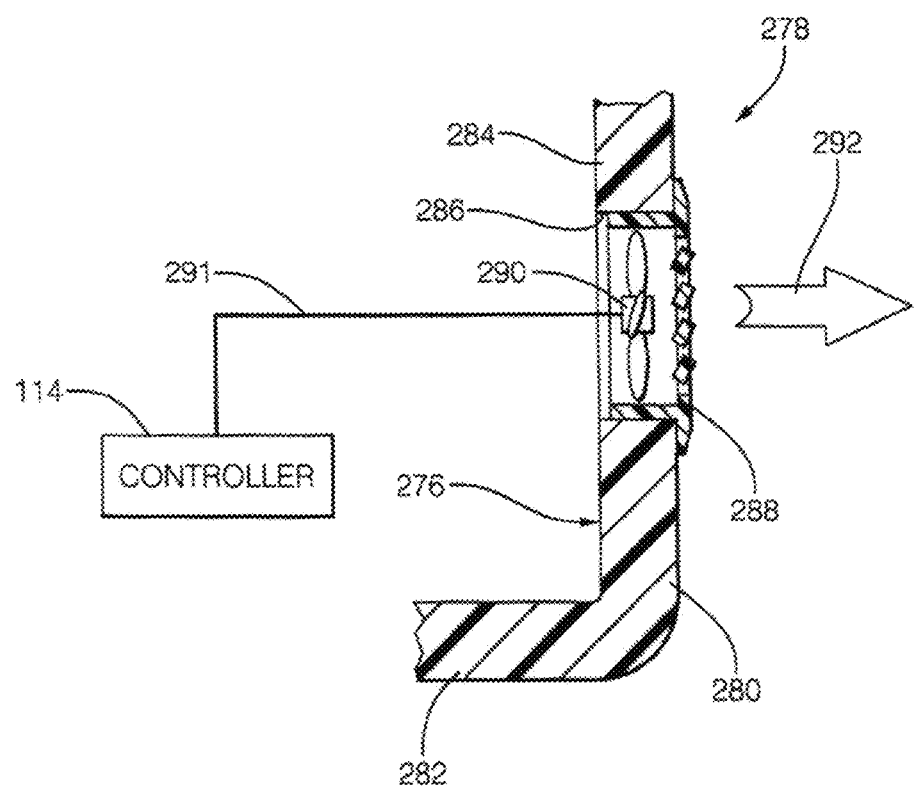
FIG. 9, shows an alternative embodiment of the invention wherein a fan and grill assembly is installed within an outer wall member of one or all of the left, right and/or center container portions and powered by vehicle electronics interface for controlled cooling of its contents.

Referring to FIG. 9, a container portion 276 of a vehicle cargo management system 278 includes a base member 280 forming a floor member 282 and a wall member 284. The wall member 284 has a through passage 286 therein for mounting an air deflection grate 288 and an electric motor driven fan assembly 290 by radially extending struts (not illustrated). When energized, the motor-fan assembly 290 operates to discharge air from within the container portion 276 into the adjacent vehicle atmosphere. As indicated by arrow 292. The motor driven fan 290 from each container portion (one or more), along with thermometers and humidistats are electrically interconnected with and controlled by the vehicle electronics interface 116 and electrical interface box by electrical or otherwise conducting control lines (refer FIG. 3).

Figure 10:
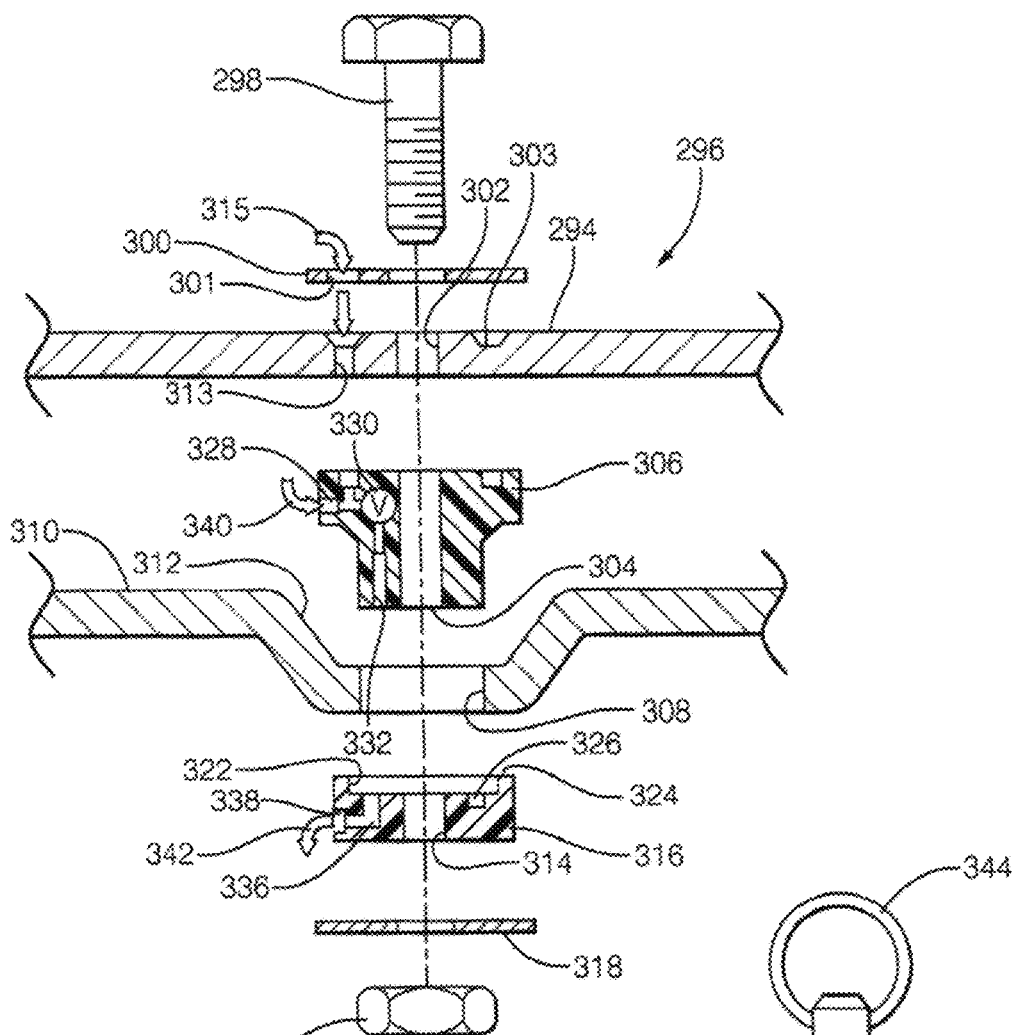
FIG. 10, shows an enlarged broken view of one mounting point of a container portion providing moisture collection and controlled drainage through the host vehicle floor pan.

Referring to FIG. 10, a mounting point of a floor member 294 of a container portion 296 of a vehicle cargo management system includes a bolt 298 extending downwardly through a load distributing washer 300. The washer 300 includes an offset through hole 301 providing a drain passage bypassing the bolt through hole 302 in the floor member 294. An annular blind recess 303 circumscribes the bolt through hole and registers with offset through hole 301 enabling drainage of water through the floor member 294. The bolt 298 extends downwardly through a passageway 304 in the upper half of a resilient plug 306 which is inserted by interference fit in an opening 308 in the floor pan 310 of an associated host vehicle. The opening 308 is preferably formed in the bottom of water accumulating pocket 312 in the floor pan 310. A drain port 313 discharges water, illustrated by arrow 315 into the water accumulating pocket 312. The bolt 298 continues, extending downwardly through a passageway 314 in a lower half of a resilient plug 316, through a load distributing washer 318, and, finally, engaging a lock nut 320. The opening 308 corresponds with an original (OE) mounting point for a rear passenger seat included with the host vehicle.

The upper resilient plug 306 is vertically elongated sufficiently to extend through and beyond the lower surface of the floor pan 310 and to engage and fully sealingly mate within an upwardly opening recess 322 formed in the upper surface 234 of the lower resilient plug 316. An annular blind recess 326 extends downwardly below the upwardly opening recess 322. A drain passage consisting of an inlet passage 328, a check valve 330 and a first internal passage 332 communicates with an annulus formed by recess 326 in the lower plug 316. A second internal passage 336 interconnects recess 326 with an outlet flow passage 338. Thus, any fluid accumulating within the container portions 22, 24 and 26 and/or the upper surface of the floor pan 310 near the mount points of the vehicle cargo management system 20 will gravitate into the accumulation pocket 312 and thereafter out of the vehicle via flow passage 328, check valve 330, internal passages 332 and 336, and outlet passage 338, as illustrated by arrows 315, 340 and 342.

Figure 11:
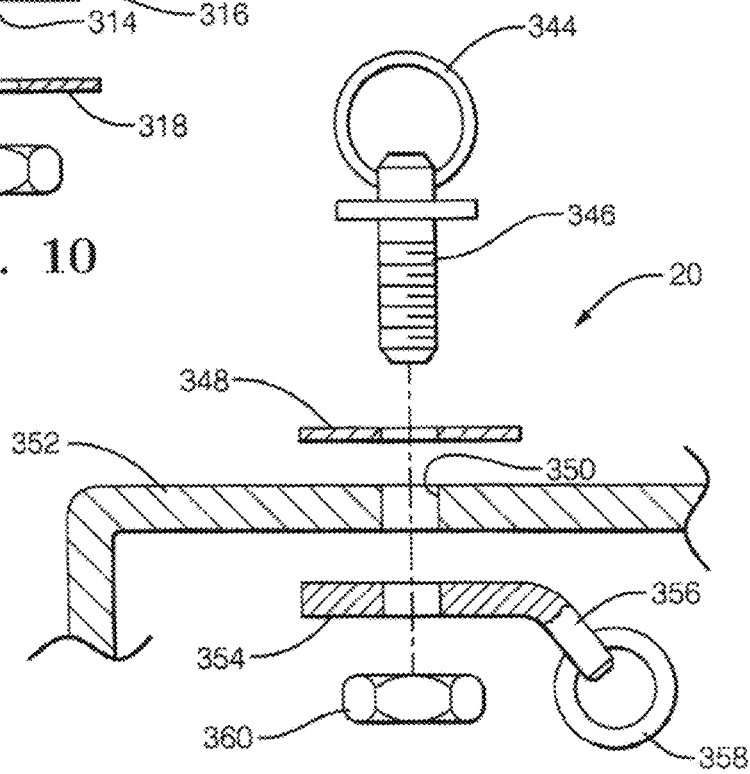
FIG. 11, shows an enlarged mounting configured for attachment to the base member or closure member of a container portion providing internal or external tie-down points for securing cargo.

Referring to FIG. 11, internal/external tie-down points can be provided as part of the present vehicle cargo management system 20. A first attachment ring 344 is carried on a threaded mounting shank 346 which extends through a load distributing washer 248 and a through hole 350 formed in either a container portion 22, 24 or 26, and/or a closure member 68, 70, or 72, herein after closure member 352. The threaded shank 346 thereafter extends through a load distributing washer 354 including a radial extension 356 supporting a second attachment ring 358 and, finally, engaging a lock nut 360.

Figure 12:
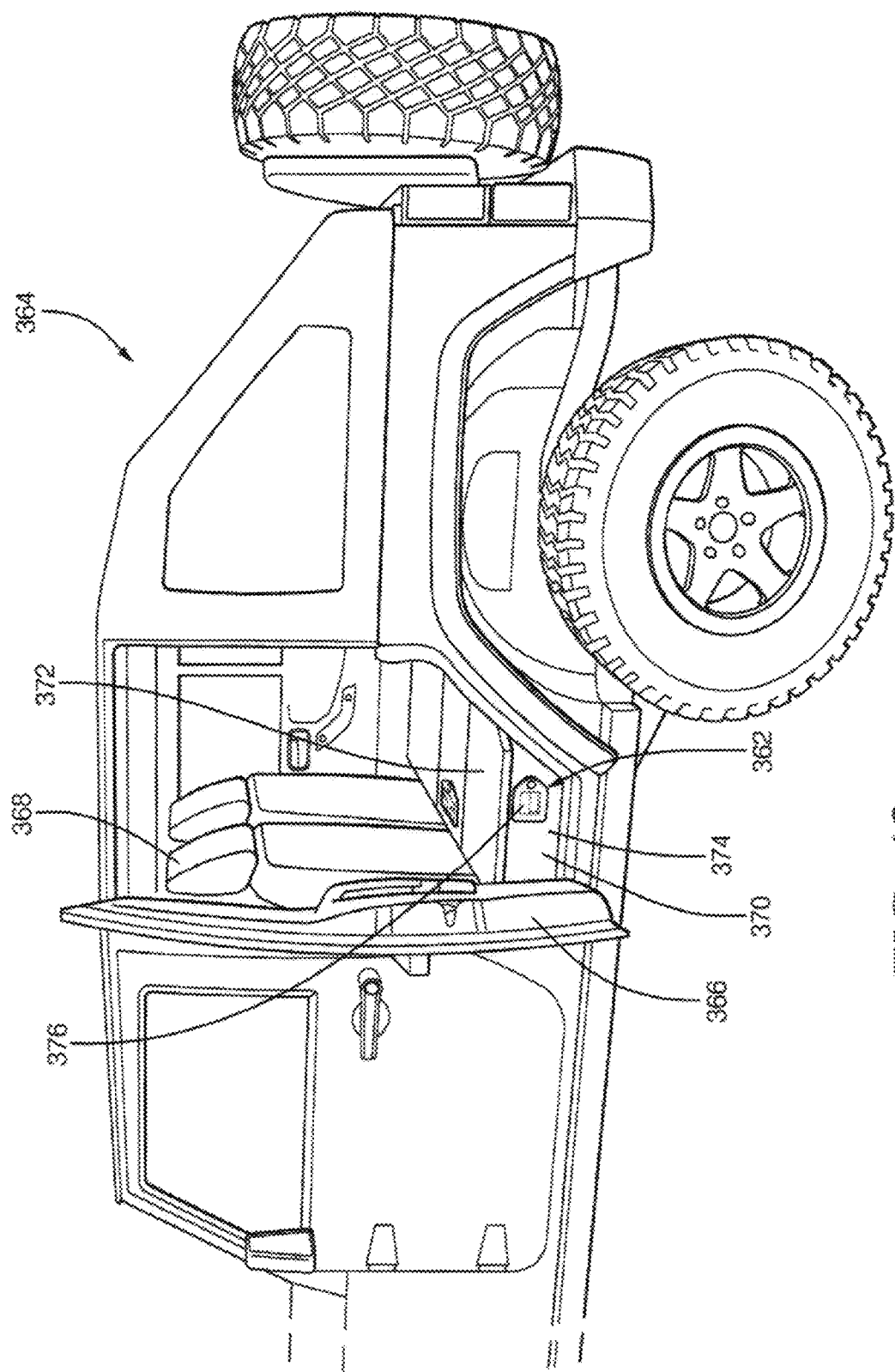
FIG. 12, shows from a left-rear, slightly elevated perspective view of a vehicle cargo management system 20 installed in a host vehicle as viewed through an open left (driver's side) rear door.

Referring to FIG. 12, a left-rear, slightly elevated perspective view of a vehicle cargo management system 362 installed in a host vehicle 364 as viewed through an open left (driver's side) rear door 366 disposed intermediate the front driver's seat 368 and the rear cargo area (not illustrated). Visible are the left side wall member 370 and left closure member 372 of the left container portion 374. Mounted on the left side wall member 370 is a driver side lock latch assembly 376, which is not visible-accessible from the exterior of the host vehicle 364 when the left driver side door is closed and locked.

Figure 13:
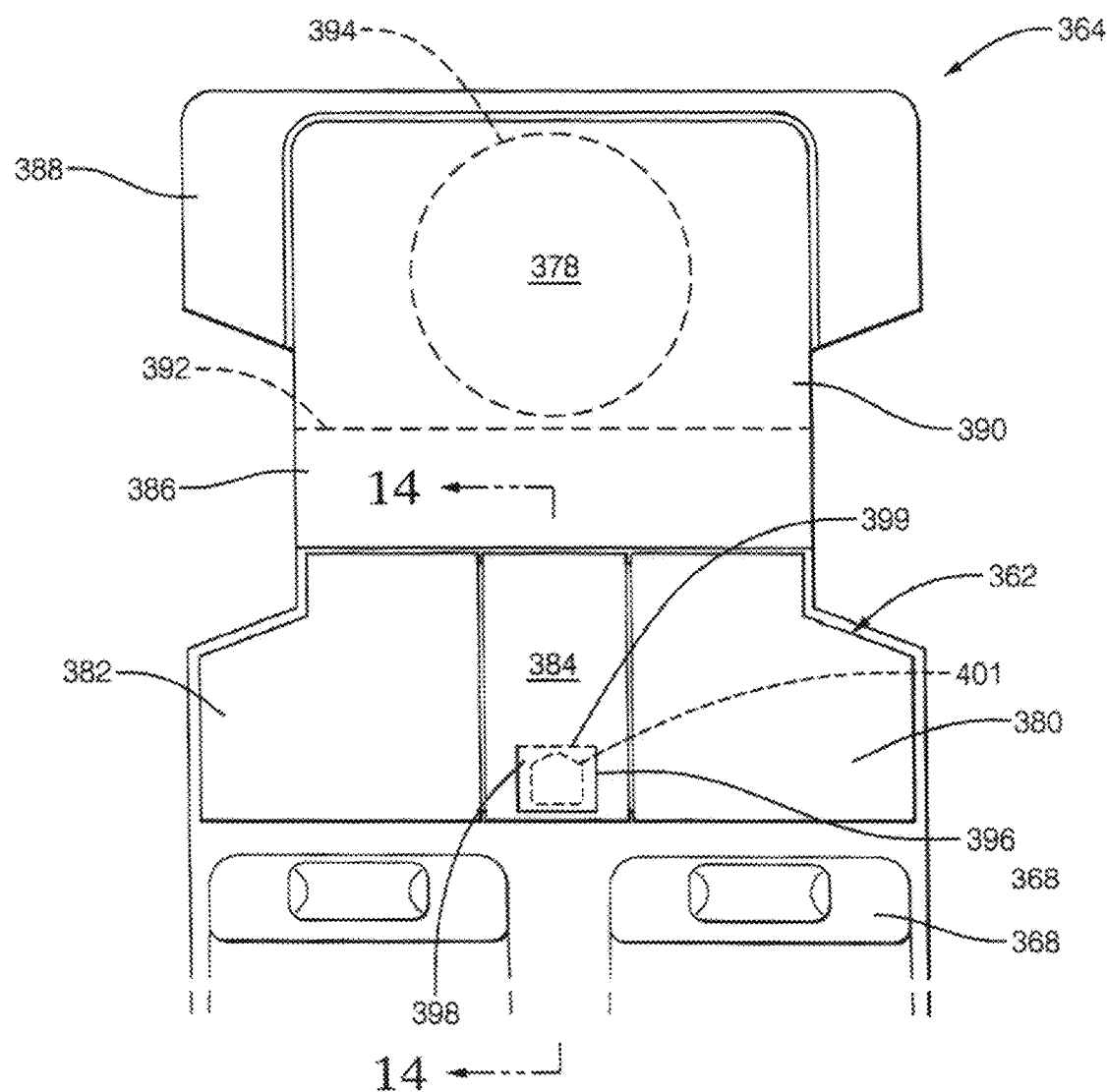
FIG. 13; shows a top plan view of the vehicle cargo management system 20 and the adjacent rear cargo area as installed in the host vehicle of FIG. 12.

Referring to FIG. 13, a top plan view of the vehicle cargo management system 362 and the adjacent rear cargo area 378 as installed in the host vehicle of FIG. 364. The vehicle cargo management system 362 is subdivided into three container portions covered by coplanar horizontal left, right and center closure members 380, 382 and 384, respectively, which are each attached to the their respective container portion by a hidden hinge, such as illustrated in FIG. 3. Similarly, the rear cargo area 378 includes forward, rearward and intermediate panel portions 386, 388 and 390, respectively, which are coplanar when in the illustrated closed position. The intermediate panel portion 390 is attached to the forward panel portion 386 by a hidden hinge 392 enabling pivotal displacement of the intermediate panel portion 390 to gain access to a spare tire 394 and other related tools. When in the closed position, closure members 380, 382 and 384, as well as panel portions 386, 388 and 390 are disposed in a horizontal, coplanar orientation. Furthermore, the closure members and panel portions are formed or covered by material having a similar appearance, texture and color, which provides an appearance from an exterior vantage point of a single unified continuous surface. Any gaps between the adjacent closure member and panel portion edges are relatively small and innocuous. Preferably, the closure members and panel portions are covered by flexible material, such as carpet to form a living hinge at certain flex points. For example, cover material overlaying the center closure member 384 is cut or scribed in the shape of a "U" 396 to define a flap 398 connected by a living hinge 399, providing concealment of the center cabin lock-latch assembly 76 illustrated in FIGS. 1 and 2.

Figure 14:
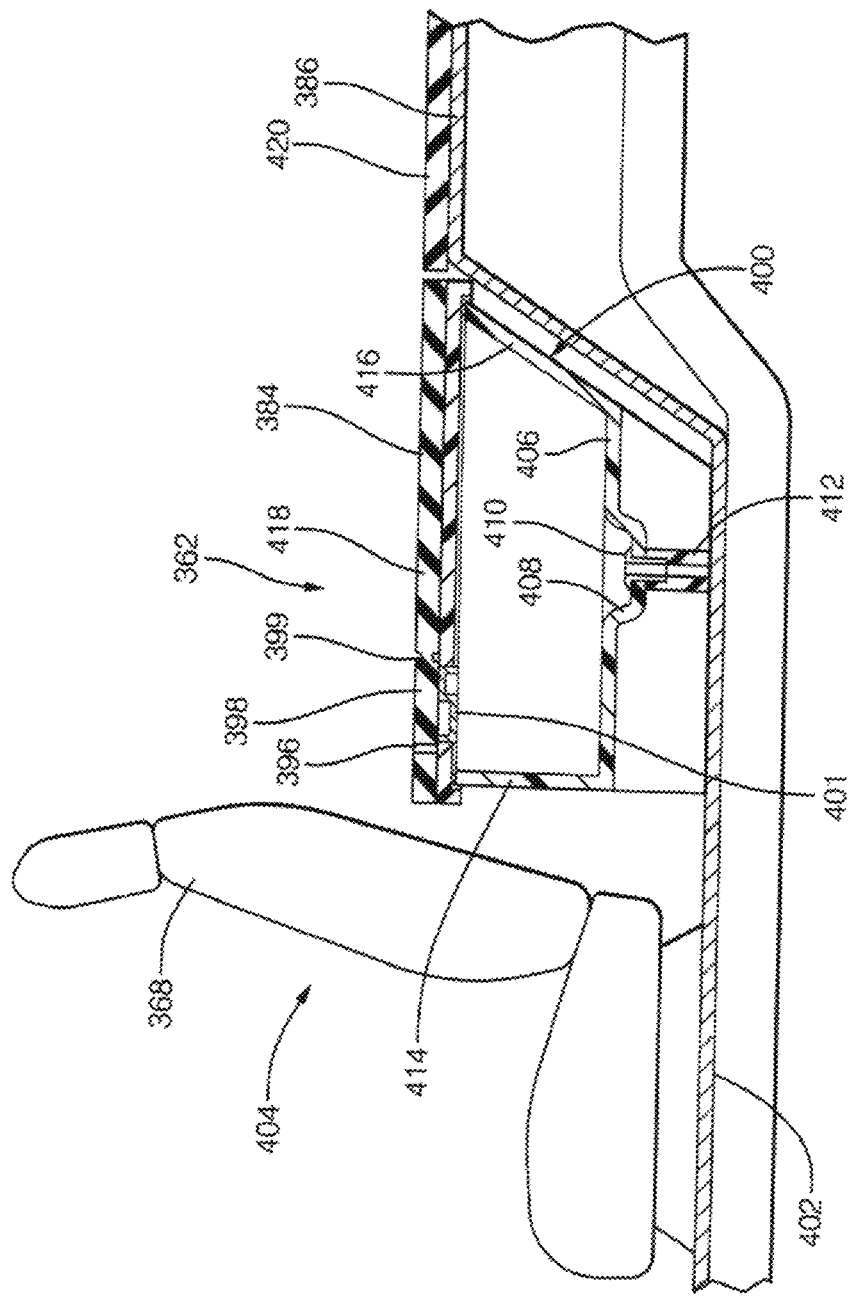
FIG. 14, shows a cross-sectional view taken on lines 14-14 of FIG. 13 of the center container portion of the vehicle cargo management system 20.

Referring to FIG. 14, a cross-sectional view taken on lines 14-14 of FIG. 13 of the center container portion 400 of the vehicle cargo management system 362. The center container portion 400 has a reduced depth dimension to provide clearance above the drive shaft tunnel 402 of the host vehicle 404. The floor 406 of the center container portion 400 includes a water accumulator 408 forming a drain port 410, which transitions into a drain conduit 412 which discharges any water from the vehicle 404 in a similar manner as illustrated in FIGS. 5 and 10. The center container portion 400 includes a front wall member 414 and a rear wall member 416. The center closure member 384 is affixed to the rear wall member 416 by an invisible hinge such as illustrated in FIG. 3. As described hereinabove, the closure members 380, 382 and 384, and panel portions 386, 388 and 390 are formed or covered by material having a similar appearance, texture and color, which provides an appearance from an exterior vantage point of a single unified continuous surface. Any gaps between the adjacent closure member and panel portion edges are relatively small and innocuous. Preferably, the closure members and panel portions are covered by flexible material, such as carpet to form a living hinge at certain flex points. As illustrated in FIG. 14, by way of example, closure member 384 is covered by a protective mat or carpet 418, and the forward panel portion 386 is covered by a similar protective mat or carpet 420. Thus configured, the vehicle cargo management system 362 is protected and camouflaged to blend with the other interior floor panel portions 386, 388 and 390 of the host vehicle 404.

Figure 15:
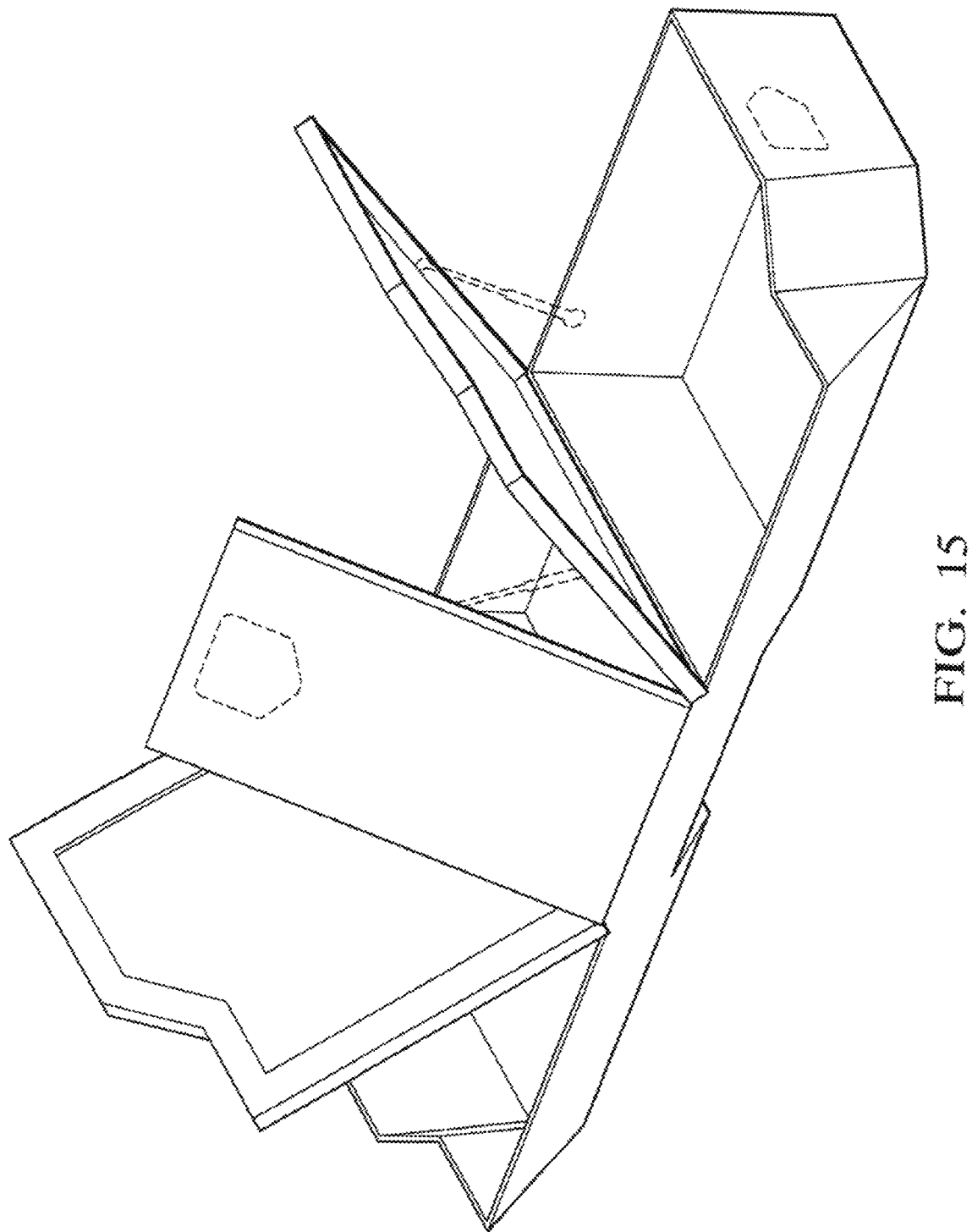
FIG. 15, shows a right-rear-elevated perspective view of a first embodiment of a new design for a vehicle management system in isolation with left, right and center closure members in a fully open position, which, as shown in FIG. 1 in a similar configuration, as mounted in the rear seating area of a host Jeep™ type vehicle.

Referring to FIG. 15, illustrated is a right-rear-elevated perspective view of a first embodiment of a new design for a vehicle management system in isolation with left, right and center closure members in a fully open position, which, as shown in FIG. 1 in a similar configuration, as mounted in the rear seating area of a host Jeep™ type vehicle.

Referring to FIG. 16, illustrated is a right-rear-elevated perspective view of the first embodiment of a new design for a vehicle management system, as shown in FIG. 15 in isolation with left, right and center closure members in a fully closed position.

Referring to FIG. 17, illustrated is a rear plan view of the vehicle management system of FIG. 16 in isolation.

Figure 18:
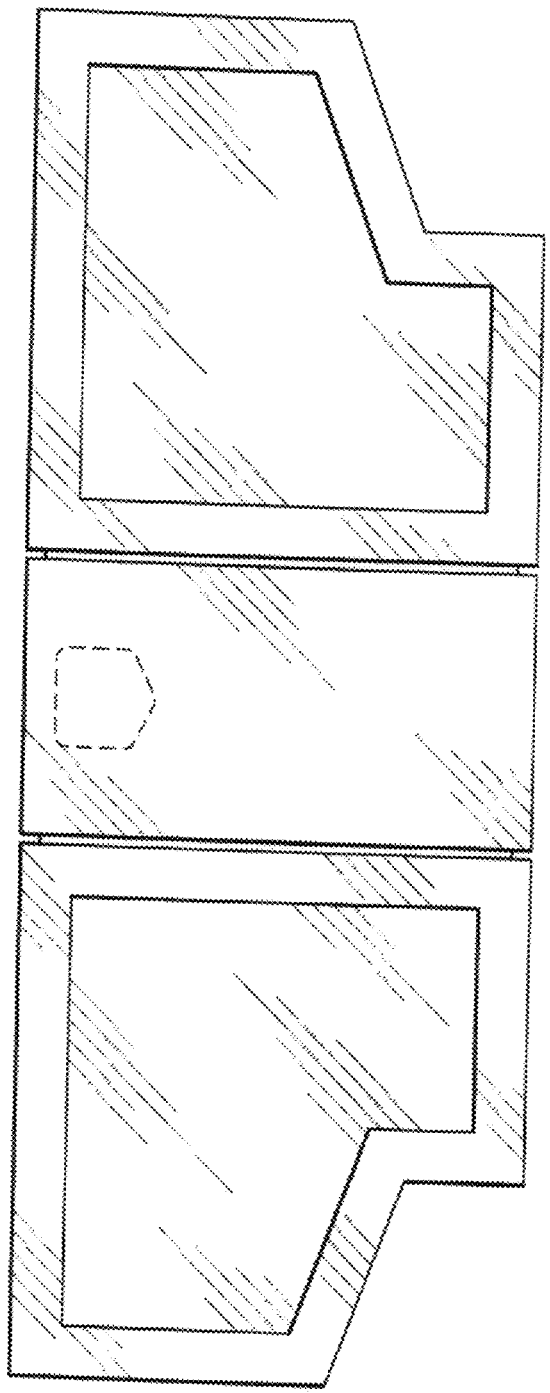
FIG. 18, shows a top plan view of the vehicle management system of FIG. 16 in isolation.

Referring to FIG. 18, illustrated is a top plan view of the vehicle management system of FIG. 16 in isolation.

Figure 19:
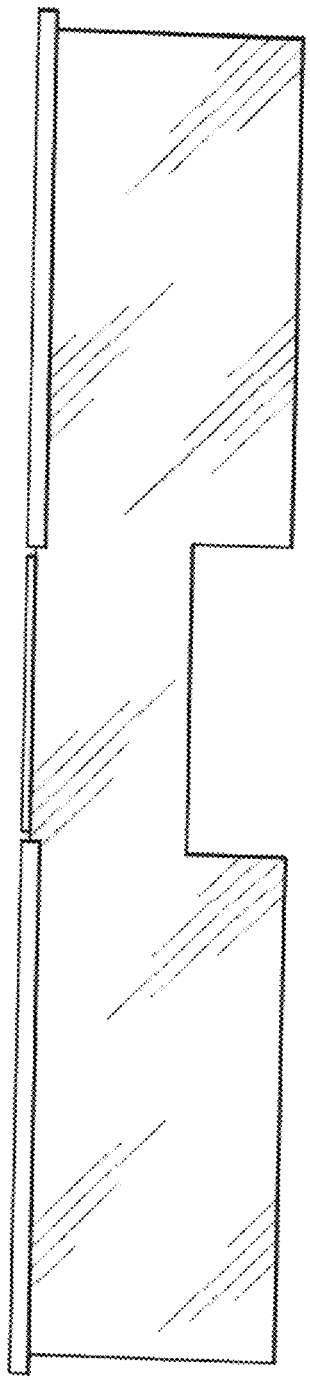
FIG. 19, shows a rear plan view of the vehicle management system of FIG. 16 in isolation.

Referring to FIG. 19, illustrated is a rear plan view of the vehicle management system of FIG. 16 in isolation.

Figure 20:
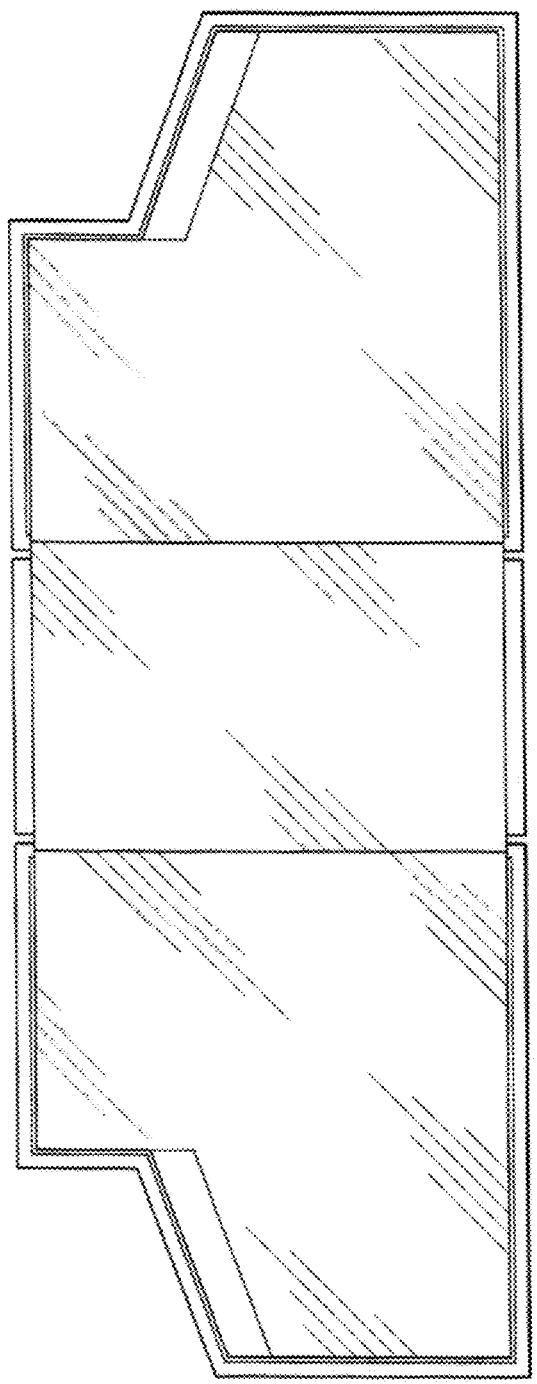
FIG. 20, shows a bottom plan view of the vehicle management system of FIG. 16 in isolation.

Referring to FIG. 20, illustrated is a bottom plan view of the vehicle management system of FIG. 16 in isolation.

Figure 21:
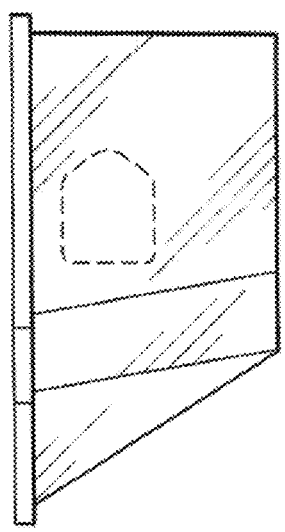
FIG. 21, shows a right side plan view of the vehicle management system of FIG. 16 in isolation.

Referring to FIG. 21, illustrated is a right side plan view of the vehicle management system of FIG. 16 in isolation.

Figure 22:
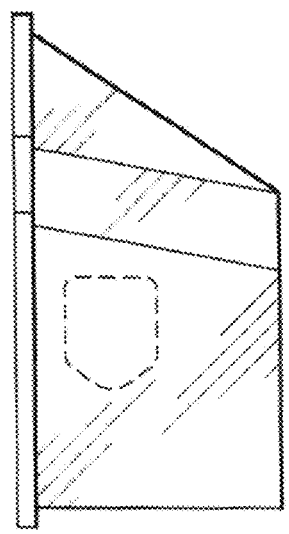
FIG. 22, shows a left side plan view of the vehicle management system of FIG. 16 in isolation.

Referring to FIG. 22, illustrated is a left side plan view of the vehicle management system of FIG. 16 in isolation.

The following documents are deemed to provide a fuller background disclosure and understanding of the inventions described herein and the manner of making and using same. Accordingly, each of the below-listed documents is hereby incorporated into the specification hereof by reference.

U.S. Pat. No. 4,122,944 to De Napoli entitled "Tool Box".
U.S. Pat. No. 4,802,705 to Elwell entitled "Truck Bed Liner and Method of Forming Same".
U.S. Pat. No. 4,957,228 to Bulka entitled "Cargo Carrier for Vans".
U.S. Pat. No. 5,598,961 to Sills entitled "Vehicle Tool Box".
U.S. Pat. No. 5,669,537 to Saleem et al. entitled "Portable Multi-Position Vehicle Storage Unit".
U.S. Pat. No. 6,050,202 to Thompson entitled "Storage Divider Shelf".
U.S. Pat. No. 6,113,172 to Chaloult et al. entitled "multi-Positional Shelf".
U.S. Pat. No. 6,253,943 B1 to Spykerman et al. entitled "Storage Divider".
U.S. Pat. No. 6,290,277 B1 to Spykerman et al. entitled "Cargo Management and Article Support Systems".
U.S. Pat. No. 6,478,355 B1 to Van Eden et al. entitled "Adaptable Pick Up Truck Configuration".
U.S. Pat. No. 6,607,228 B2 to Carter, III et al. entitled "Storage Apparatus for Automobiles".
U.S. Pat. No. 6,874,667 B2 to Dykstra et al. entitled "Vehicle Cargo Management System".
U.S. Pat. No. 7,093,871 B2 to Lim et al. entitled "Expandable Cargo Box Arrangement for a Vehicle".
U.S. Patent Application Publication No. 2008/0231066 A1 to Harrell entitled "Flatbed Tool Drawers".
U.S. Patent Application Publication No. 2009/0108591 A1 to De Vries entitled "Storage Containers and Latch Systems for Storage Containers".
U.S. Patent Application Publication No. 2009/0108592 A1 to De Vries entitled "Storage Containers and Latch Systems for Storage Containers".
U.S. Patent Application Publication No. 2009/0108595 A1 to De Vries entitled "Latching Mechanisms for Storage Containers".
U.S. Patent Application Publication No. 2009/0200350 A1 to Brallier et al. entitled "Truck Tool Box and Hinge System".
U.S. Pat. No. 8,075,040 B2 to Arnold entitled "Vehicle Having Utility Bed and Seat".
U.S. Patent Application Publication No. 2012/0112487 A1 to Wilson entitled "Truck Trunk Cargo Carrier".
U.S. Pat. No. 8,393,665 B2 to Villano et al. entitled "Pick-Up Truck Bed Tool Box System".
U.S. Pat. No. 8,544,708 B2 to Maimin entitled "Folding Pick-Up Truck Tool Box".
U.S. Patent Application Publication No. 2015/0121974 A1 to Schuling et al. entitled "Locking Mechanisms and Toolboxes Including Locking Mechanisms".
U.S. Pat. No. 9,096,179 B2 to Reiseder entitled "Deployable Vehicle Cargo Carrier".
U.S. Design Pat. No. D772,141 S to Christofferson entitled "Truck Tool Box".
U.S. Pat. No. 9,580,021 B1 to Pizarro entitled "Cargo Management System".
U.S. Patent Application Publication No. 2017/0121054 A1 to Schuling et al. entitled "Storage Containers and Methods of Shipping".
U.S. Pat. No. 9,731,659 B2 to Goldberg entitled "Vehicle Rooftop Cargo Holder".
U.S. Pat. No. 9,797,167 B2 to Schuling et al. entitled "Locking Mechanisms and Toolboxes Including Locking Mechanisms".
U.S. Patent Application Publication 2018/0118128 A1 to Schuling entitled "Lid Assemblies for Storage Containers Including Vibration Damping Substrates".
U.S. Pat. No. 10,124,738 B2 to Cronin et al. entitled "Roof Rack Assemblies and Securing Mechanisms for Roof Rack Assemblies".
U.S. Pat. No. 10,150,420 B2 to Stojkovic entitled "Doors Off Storage".
U.S. Patent Application No. 2019/0126832 A1 to Knichel entitled "Adjustable Vehicle Side Step Assemblies".
U.S. Patent Application No. 2019/0126994 A1 to Brown entitled "Cap Assemblies for Truck Bed Sidewalls Including Adaptor Assemblies with Accessory Channels".
U.S. Pat. No. 10,358,059 B2 to Keziah et al. entitled "Utility Vehicle".
U.S. Patent Application No. 2019/0256008 A1 to Rustwick entitled "Vehicle Hooks".
U.S. Patent Application No. 2019/0256156 A1 to Schuling entitled "Adaptable Truck Bed Storage".
U.S. Pat. No. 10,479,285 B2 to Schuling entitled "Lid Assemblies for Storage Containers Including Vibration Damping Substrates".

It is to be understood that the invention has been described with reference to specific embodiments and variations to provide the features and advantages previously described and that the embodiments are susceptible of modification as will be apparent to those skilled in the art.

Furthermore, it is contemplated that many alternative, common inexpensive materials can be employed to construct the basis constituent components. Accordingly, the forgoing is not to be construed in a limiting sense.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for illustrative purposes and convenience and are not in any way limiting, the invention, which is defined by the following claims as interpreted according to the principles of patent law, including the Doctrine of Equivalents, may be practiced otherwise than is specifically described.

The invention claimed is:

1. A vehicle cargo management system adapted for installation in the rear seating area of a utility vehicle having removable left and right rear seats disposed adjacent left and right rear side doors, respectively, said utility vehicle including a floor pan defining a planer rear storage surface and left and right foot wells separated by a longitudinally extending drive shaft hump underlying said rear seats, said foot wells defining inwardly tapered left and right inner rear wheel wells, said left and right foot wells each having a characteristic vertical depth below said rear storage surface, a lateral width and a longitudinal length, said cargo management system comprising:
- a left container portion having a base member including integrally formed floor and circumferentially arranged wall members configured to be nestingly disposed within said left foot well;
- a right container portion having a base member including integrally formed floor and circumferentially arranged wall members configured to be nestingly disposed within said right foot well;
- a center container portion having a base member including integrally formed floor and circumferentially arranged wall members configured to be nestingly disposed above said drive shaft hump;
- a left closure member affixed to an inner longitudinally extending wall member of said left container portion by a first, longitudinally elongated hinge;
- a right closure member affixed to an inner longitudinally extending wall member of said right container portion by a second, longitudinally elongated hinge; and
- a center closure member affixed to a rearward laterally extending wall member of said center container portion by a third, laterally elongated hinge.

2. The cargo management system of claim 1, wherein said left, right and center container portions are integrally formed.

3. The cargo management system of claim 1, wherein said left, right and center container portions are separately formed and are releasably interconnected by discrete fasteners, whereby said right container portion can be removed and replaced by the right rear seat and, independently, said left container portion can be removed and replaced by the left rear seat.

4. The cargo management system of claim 1, further comprising releasable connectors alternatively affixing said container portions and said seats to said floor pan.

5. The cargo management system of claim 1, wherein said left, right and center closure members form upper planer surfaces substantially coplanar with the rear storage surface.

6. The cargo management system of claim 1,
wherein said left container portion includes a flush lock/latch mechanism operable to selectively secure the left closure member in the closed position and is accessible only upon opening the left rear door,
wherein said right container portion includes a flush lock/latch mechanism operable to selectively secure the right closure member in the closed position and is accessible only upon opening the right rear door, and
wherein said center container portion includes a lock/latch mechanism operable to selectively secure the center closure member in the closed position and is accessible only by/from the driver/front seat passenger positions.

7. The cargo management system of claim 6, further comprising a security holder or holster affixed to the underside of said center closure member within said center container portion.

8. The cargo management system of claim 1, further comprising a shaped resilient membrane encased between the outer surfaces of said container portions and their respective foot wells as a rattle/noise suppressor.

9. The cargo management system of claim 1, further comprising a resilient seal disposed between the opposed surfaces of the container portions and their associated closure members as a rattle/noise suppressor.

10. The cargo management system of claim 1, wherein said hinges comprise elongated piano-type hinges affixed at the interface between each container portion and an associated closure member.

11. The cargo management system of claim 1, further comprising a moisture drain extending from the base member of at least one container portion downwardly through an adjacent portion of a foot well, wherein said drain includes a check-valve operative to block reverse flow of moisture into a container portion.

12. The cargo management system of claim 1, further comprising a damper or latch operative to hold the closure members in or near the full open position.

13. The cargo management system of claim 1, further comprising tie down attachments affixed internally and/or externally of said container portions and or closure portions.

14. The cargo management system of claim 1, further comprising a lifting grate disposed within at least one of said closure portions to space contents off the lower portion thereof.

15. The cargo management system of claim 1, further comprising an electric fan operative to vent air from within one or all of said container portions and maintain a slight negative air pressure therein.

16. The cargo management system of claim 1, further comprising an electrical system operative to react to the opening/closure of one of said closure members, to convert 12 VDC to 120 VAC, to selectively illuminate the interior of the container portions, and the selectively provide power and communication interfaces to a vehicle operator/passenger.

17. The cargo management system of claim 16, wherein said electrical system comprises at least one driver accessible USB port.

18. The cargo management system of claim 17, wherein said electrical system comprises at least one temperature and/or humidity sensor within at least one of said left, right and center container portions.

19. A vehicle cargo management system adapted for installation in the rear seating area of a utility vehicle having removable left and right rear seats disposed adjacent left and right rear side doors, respectively and forward of a rear storage surface, said cargo management system comprising:
- a left container portion having a base member including integrally formed floor and circumferentially arranged wall members;
- a right container portion having a base member including integrally formed floor and circumferentially arranged wall members;
- a center container portion having a base member including integrally formed floor and circumferentially arranged wall members;
- a left closure member affixed to an inner longitudinally extending wall member of said left container portion by a first, longitudinally elongated hinge;
- a right closure member affixed to an inner longitudinally extending wall member of said right container portion by a second, longitudinally elongated hinge; and
- a center closure member affixed to a rearward laterally extending wall member of said center container portion by a third, laterally elongated hinge,
- wherein said left, right and center closure members form upper planer surfaces substantially coplanar with the rear storage surface,
- wherein said left container portion includes a flush lock/latch mechanism operable to selectively secure the left closure member in the closed position and is accessible only upon opening the left rear door, wherein said right container portion includes a flush lock/latch mechanism operable to selectively secure the right closure member in the closed position and is accessible only upon opening the right rear door, wherein said center container portion includes a lock/latch mechanism operable to selectively secure the center closure member in the closed position and is accessible only by/from the driver/front seat passenger positions.

\* \* \* \* \*